United States Patent [19]
Schilke et al.

[11] 4,123,493
[45] Oct. 31, 1978

[54] METHOD OF MAKING A SHOE SOLE HAVING A PREFORMED INSERT

[75] Inventors: Waldemar Schilke, Trenton; Ladislav Hujik, Batawa, both of Canada

[73] Assignee: Bata Shoe Company, Inc., Belcamp, Md.

[21] Appl. No.: 793,398

[22] Filed: May 3, 1977

[51] Int. Cl.² ............... B29C 5/00; B29D 3/00; B29D 31/00; B29F 1/10
[52] U.S. Cl. .................. 264/244; 264/250; 264/255; 264/275; 264/328; 425/119; 425/129 S; 425/130
[58] Field of Search ............. 264/244, 250, 255, 271, 264/275, 328; 425/119, 129 S, 130; 36/30 R, 32 R

[56] References Cited
U.S. PATENT DOCUMENTS

| 2,383,122 | 8/1945 | Ghez et al. | 36/32 R |
| 2,552,601 | 5/1951 | Supple | 36/32 |
| 2,724,912 | 11/1955 | Silombra | 36/30 R |
| 2,772,194 | 11/1956 | Fisher et al. | 264/271 |
| 2,996,764 | 8/1961 | Ross et al. | 264/271 |
| 3,284,558 | 11/1966 | Ludwig | 425/129 S |
| 3,596,381 | 8/1971 | Fukuoka | 36/32 R |
| 3,761,554 | 9/1973 | Barnette | 264/255 |
| 3,983,204 | 9/1976 | Opinsky et al. | 425/119 |

Primary Examiner—W.E. Hoag
Attorney, Agent, or Firm—Holman & Stern

[57] ABSTRACT

Method for making a sole for an article of footwear including an outer sole with a lightweight filler therein, an inner sole above the outer sole and a foxing strip integral with the inner sole and surrounding the periphery of the outer sole. The sole is produced using a dummy last with a recess for receiving the filler, a clamping last, mold sides and a bottom mold piston. The outer sole is molded first using the dummy last and filler, a first portion of the mold sides and the mold piston to define a first mold cavity. Then, the inner sole is molded using the clamping last, a lasted upper or the like, a second portion of the mold sides, and the outer sole on the mold piston to define a second mold cavity. By providing suitable recesses in the dummy last and in the first portion of the mold sides, one or more projections which extend through the foxing strip are molded in the first mold cavity.

2 Claims, 12 Drawing Figures

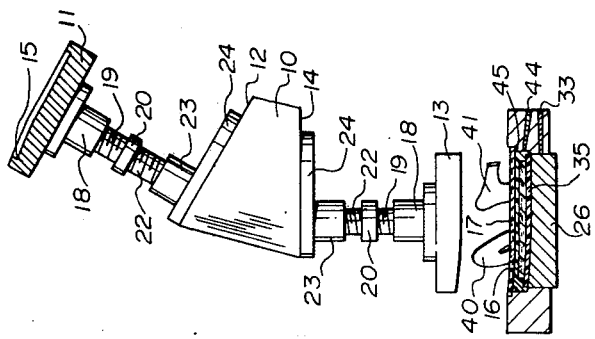
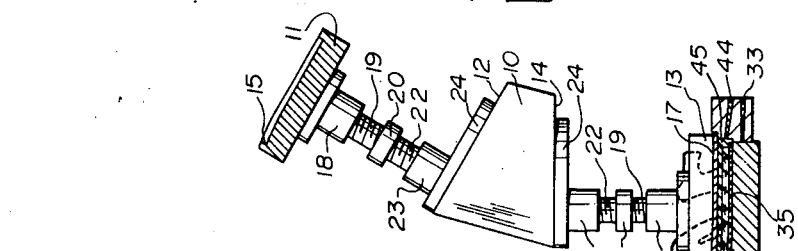
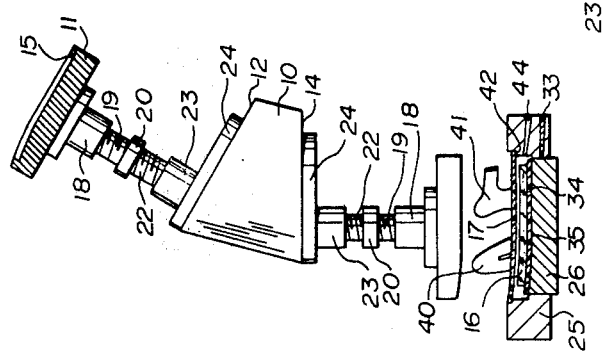
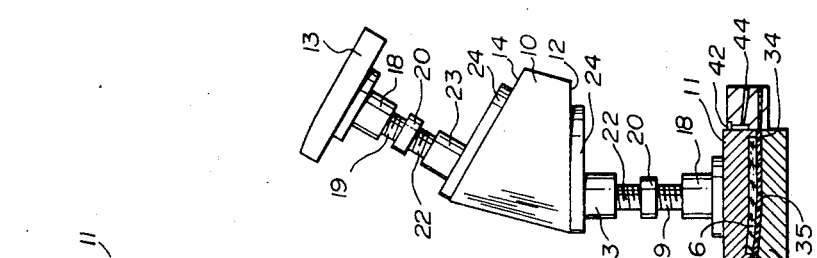
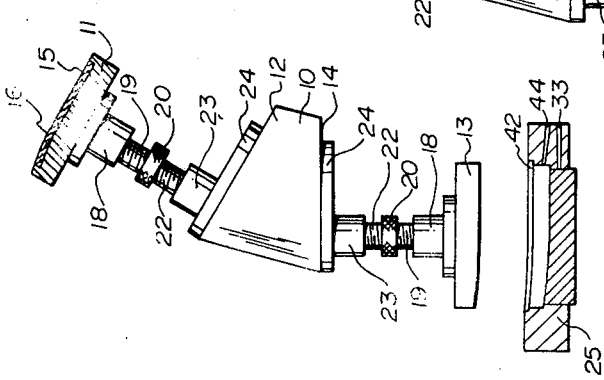

METHOD OF MAKING A SHOE SOLE HAVING A PREFORMED INSERT

BACKGROUND OF THE INVENTION

1. Field of the Invention

This invention relates to a method and apparatus for molding a sole for an article of footwear, and to a sole produced using such method and apparatus.

2. Description of the Prior Art

In the production of plastic, e.g., polyvinyl chloride footwear soles, it is common practice to include a filler, e.g., a cork filler in the sole for making the sole lighter and, in some cases, less expensive. One method of producing soles containing a filler involves attaching the filler to a lasted upper, for example, using hooks extending downwardly from the last and then molding a sole around the sides and outer surface of the filler. One disadvantage of such a method is that the filler can move during injection molding of the plastic material under pressure. Moreover, in the resulting product, while the plastic sole around the filler is connected to the upper, there is no adhesion between the top surface of the filler and the upper.

The object of the present invention is to avoid the above disadvantage by providing a molding method and apparatus in which a filler is molded into and substantially surrounded by a sole, which is attached directly to a shoe upper or the like.

SUMMARY OF THE INVENTION

Accordingly, this invention provides a method of molding a sole for an article of footwear in which a first sole portion is molded onto the bottom surface of a filler in a first molding step; and a second sole portion is molded around the sides of the first sole portion and over the top and side surfaces of the filler in a second molding step.

The present invention also provides an apparatus for carrying out the above method including a movable bottom mold piston; movable mold sides; a dummy last with a recess in the outer surface thereof for receiving a filler and for forming a first mold cavity with the mold piston and mold sides; and a clamping last for retaining an upper or the like and forming a second mold cavity with a molded first sole portion and the mold sides. The molded first sole portion is a insert including the filler and a layer of plastic molded onto the bottom surface thereof.

More specifically, in the production of a footwear sole, the dummy last disposed on a rotatable last holder is initially located in a loading position for receiving the filler. After insertion of the filler in the recess of the dummy last, the last holder is rotated 180° and lowered, and the mold sides are closed to form a first mold cavity with the bottom mold piston and dummy last. A first injection of thermoplastic material is performed to mold the first sole portion or insert. Following a curing or solidification period, the last holder is raised and rotated 180°, the mold sides are opened, the bottom mold piston is raised with the insert, the mold sides are closed and the last holder is lowered to position the clamping last and the upper or the like in a second molding position. In the second molding position, the insert, mold sides, and the upper or the like on the clamping last form a second mold cavity. A second injection molding operation is performed to yield a complete sole on an upper or the like. Following a final curing step, the mold is opened, i.e., the last holder is raised and the mold sides are opened to permit removal of the finished product.

The finished product includes the first sole portion or insert, the second sole portion surrounding the sides and top surfaces of the insert, and an upper or the like. When producing a sandal, an insole with straps is positioned beneath the clamping last during the second molding operation. Of course, the clamping last and insole can be replaced by a conventional lasted upper, in which case the sole is molded directly onto the upper. Thus, in the present specification and appended claims, the expression "upper or the like" is intended to mean an article, e.g., upper or insole placed between the clamping last and the mold sides during the second molding operation.

Using the above described method and apparatus, a molded sole containing a filler is produced, with the filler connected directly to the plastic injected during each of two injection steps. When using a cork filler and polyvinyl chloride or a similar plastic, the cork is precemented by dipping in a plastic cement, e.g., polyurethane. Because the filler is held in a recess in the dummy last during the first molding step, no movement of the filler is possible. Thus, the position of the filler in the finished sole is constant with the same quantity of plastic surrounding the filler from one sole to the next. Normally, the plastic used for the insert is a different colour from the plastic used in the second molding step which forms a foxing around the insert and covers the top of the insert.

Another significant feature of the present invention is the molding of ornamentation in the first molding step, the ornamentation appearing at the outer surface of the foxing following the second molding step. It is common practice to paint or otherwise apply decorative strips, circles or other ornaments to the foxing of the finished sole of an article of footwear, e.g., a basketball shoe or boot. By providing suitable recesses in the dummy last and in the portion of the mold sides used for the first molding step, the insert produced by such step includes outwardly extending projections, which can have any desired shape, e.g., circles or maple leaves. In the second molding step, different portions of the mold sides are employed and plastic material is molded around the projections, the outer surfaces thereof appearing in the finished sole.

Accordingly, the invention also provides a sole for an article of footwear including an insert formed of a filler of lightweight material, and a first plastic sole portion molded onto the bottom of the filler and extending outwardly beyond the periphery thereof; at least one lug extending upwardly from and integral with at least one side of the first sole portion; an outwardly extending projection on the lug; and a second plastic sole portion surrounding the top and sides of the insert, the projection extending outwardly through the second sole portion, whereby the outer surface of the projection appears on the outside of the sole.

BRIEF DESCRIPTION OF THE DRAWINGS

FIGS. 3 to 7 are schematic, partly sectioned elevation views of the last holder, lasts and mold of the apparatus of the present invention;

DESCRIPTION OF THE PREFERRED EMBODIMENT

The apparatus of the present invention can be used in a variety of molding machines, including that disclosed by Ladislav Hujik's U.S. Pat. No. 3,915,608 issued Oct. 28, 1975. Thus, the apparatus of this invention can be used with a single or multi-station molding machine, provided the machine is intended for use with at least one last holder and mold of the type described hereinafter.

Figure 1:
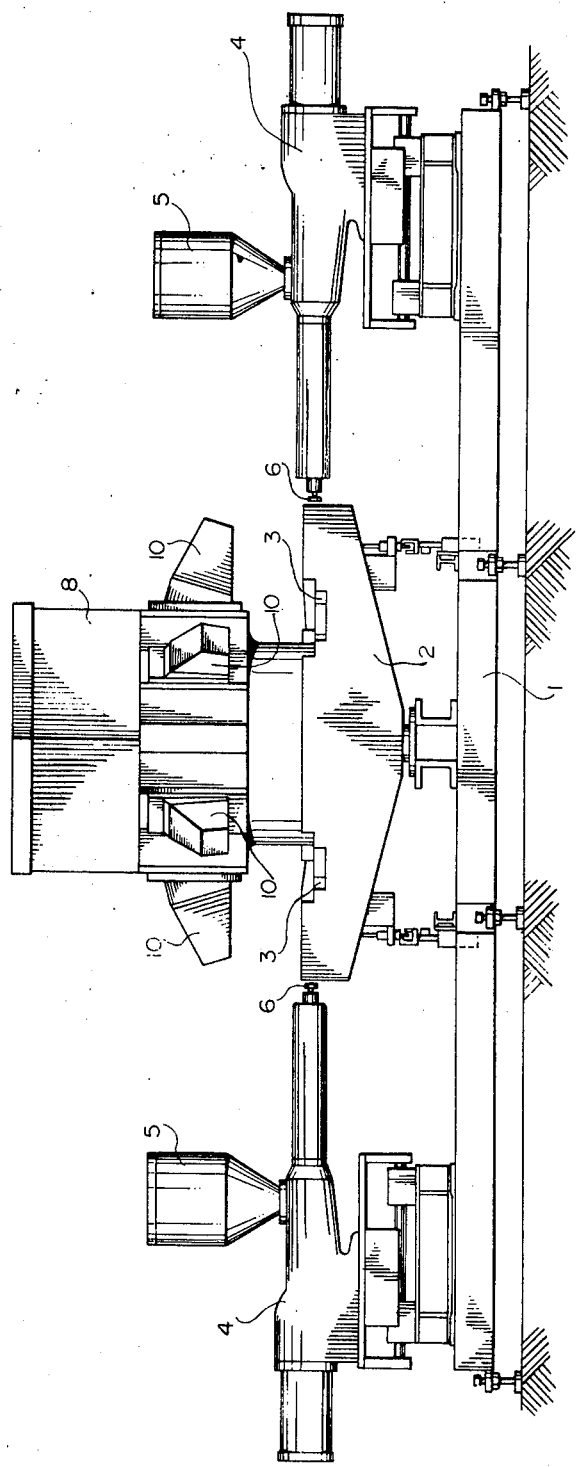
FIG. 1 is an elevation view of an injection molding machine of the type which can be used with the apparatus of the present invention.
Figure 2:
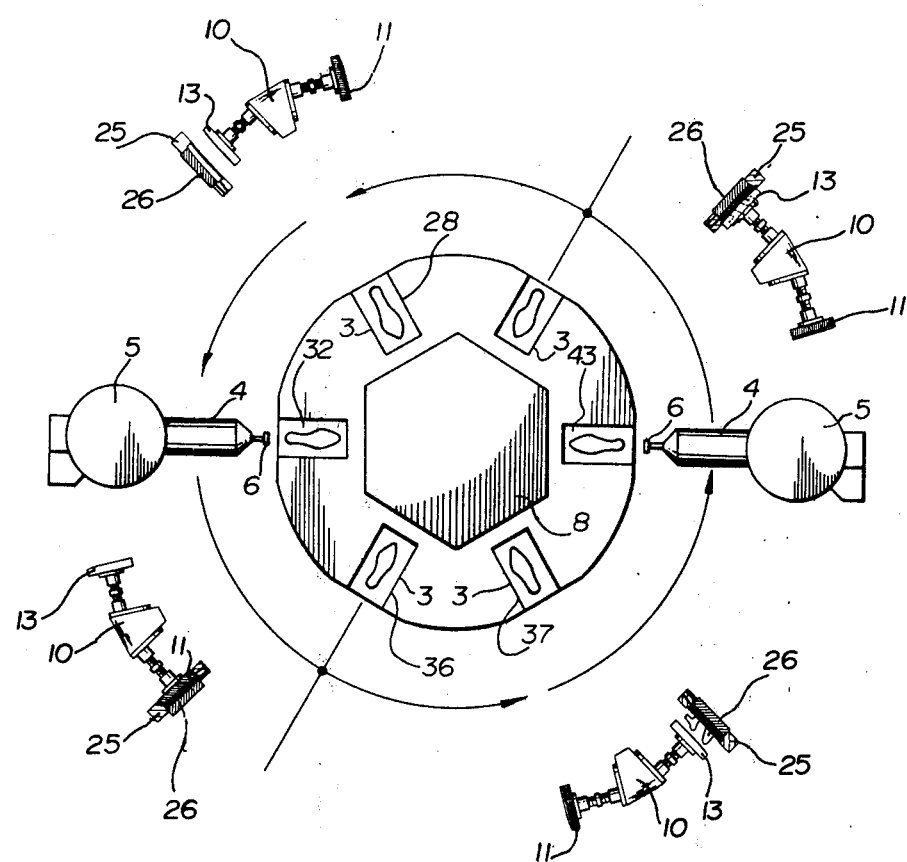
FIG. 2 is a schematic plan view of the machine of FIG. 1.

With reference to FIGS. 1 and 2, as disclosed in the above-mentioned U.S. patent, an injection molding machine incorporating the apparatus of the present invention includes a base 1 supporting a rotatable turntable 2. The turntable 2 is generally circular and is provided with six molds 3 for receiving a liquid plastic material from a pair of extruders 4. Powdered or granular thermoplastic material (in this case, polyvinyl chloride) is fed into a hopper 5 at one end of each extruder 4 and emerges in liquid form through a dispensing head 6 into one end of the mold 3.

A central column 8 on the turntable 2 is provided with six last holders 10 located above the turntable 2 at 60° to each other. Each last holder 10 supports two lasts (not shown in FIG. 1) including a dummy last 11 on one side 12 of the last holder and a clamping last 13 on the opposite side 14 thereof. The last holders 10 are rotatable and vertically slidable on the column 8, so that the lasts 11 and 13 can be moved into position to form molding cavities as described in detail hereinafter.

The dummy last 11 (FIGS. 3 to 7 and 9) includes a recess 15 over most of its outer area for receiving a filler 16 formed of cork or another lightweight material such as a plastic. The clamping last 13 is a thick plate in the shape of a shoe sole for holding an insole 17 (FIG. 5) on the top of the mold during a second molding operation. It should be noted that, for the sake of simplicity, this description of the preferred embodiment has been limited to the production of a sandal requiring a simple insole 17. However, for producing a shoe or boot with an upper (rather than an insole and straps), the clamping last and insole would be replaced with a lasted upper. Each of the lasts 11 and 13 is provided with an internally threaded sleeve 18 for receiving one end of a threaded shaft 19 which extends into a knurled nut 20. Another threaded shaft 22 extends from the other side of the knurled nut 20 to an internally threaded sleeve 23 on a plate 24 on the last holder 10. Thus, the spacing between the last holder 10 and the lasts 11 and 13 can be adjusted.

Each of the molds 3 includes a pair of mold sides 25, which can be moved transversely between open and closed positions, and a vertically movable mold piston 26. The mold sides 25, mold piston 26 and one of the lasts 11 or 13 act together to form a mold cavity in the manner described hereinafter.

In order to produce a sole for a sandal using the apparatus of the present invention, with the dummy last 11 in the upper position (FIG. 3), a filler 16 is placed in the recess 15. The recess 15 is sufficiently small that the filler 16 fits snugly and will not fall out of the recess when the last holder 10 is rotated. Loading of the dummy last 11 occurs at mold station 28 (FIG. 2) of the six station molding machine described hereinbefore. At mold station 28, the mold piston 26 is in a raised position and the mold sides 25 are in the open position, i.e., spaced apart. Following loading of the filler 16 (FIG. 3), the mold piston 26 is lowered, the last holder 10 is rotated 180° and lowered, and the mold sides 25 are moved together to the molding position to form a first mold cavity. The mold 3 and last holder 10 are rotated as a unit to mold station 32 where thermoplastic material is injected from one of the extruders 4 via a port 33 into the mold cavity to form an insert 34 (FIG. 4). The insert 34 includes the filler 16 and a first sole portion 35 of thermoplastic material injected into the mold cavity. With the mold still closed, the turntable 8 again rotates so that the mold 3 reaches station 36 where the first sole portion 35 in the mold is permitted to cool. The next step in the process occurs at mold station 37 and involves opening the mold 3 by raising the dummy last 11 and moving the mold sides 25 to the open position. When the mold 3 is opened, the insert 34 molded in the first molding operation remains on the mold piston 26.

While still at station 37, the last holder 10 is rotated 180° so that the clamping last 13 is above the mold 3 (FIG. 5). The mold piston 26 is raised and the mold sides 25 are closed. A sandal insole 17 with toe and heel straps 40 and 41, respectively attached thereto is placed on the sides 25 in a top recess defined by a shoulder 42 in the mold sides. The clamping last 13 is lowered onto the insole 17 and the mold 3 is rotated to station 43 where a second injection molding occurs, thermoplastic material being injected from the second extruder 4 via mold port 44 into the second mold cavity defined by the insert 34, the mold sides 25 and the insole 17 on the bottom of the clamping last 13 to form a second sole portion 45. The second sole portion 45 covers the insert 34 and connects the insert to the insole 17. The turntable 8 is then rotated so that the mold 3 moves to station 46 for cooling of the second sole portion 45. The sandal is now complete and it only remains to rotate the turntable 8 again to move the mold 3 to position 28 where the mold is opened, a finished sandal removed and the above steps repeated.

The operation of the molding machine has been described for a single mold 3. The same steps occur with each of the molds on the turntable 2. Of course, the same sequence of molding and curing steps could be performed with a single mold at one location, but for efficient production a multi-station machine is preferred. For continuous operation, once each dummy last 11 has been loaded with a filler, the above sequence of first and second molding operations is carried out continuously with two operators, one at station 28 for loading the fillers in the dummy lasts and rotating the last holder to place the dummy lasts above the mold 3, and for unloading finished sandals; and a second operator at station 37 for rotating the last holders to place the clamping lasts 13 above the molds and for loading the insoles 17 onto the mold sides 25.

A variety of footwear soles can be produced using the apparatus of the present invention. Basically, the apparatus and method are intended for the production of two-colour soles, with one colour forming the outer sole or insert and another colour forming an inner sole and a foxing strip extending around the outer sole. The exact form of the sole will depend on the mold design.

An especially preferred form of sole will now be described with reference to FIGS. 8 to 12. As mentioned hereinbefore, it is common practice to paint or otherwise apply ornamentation to foxing strips on basketball shoes and the like. By employing the mold described hereinafter, it is possible to mold an insert or outer sole of a first colour and then mold a foxing of a second colour around the insert with one or more portions of the insert projecting through the foxing in any desired pattern. Wherever possible, the reference numerals used in FIGS. 3 to 7 have been used to identify the same or similar elements in FIGS. 8 to 12.

The mold sides 25 used for such purpose are the same as the mold sides of FIGS. 3 to 7, except that a plurality of maple leaf-shaped recesses 47 with tapering sides are provided in each side mold 25. Each recess 47 is provided with a cylindrical blind hole 48 (FIG. 10) in the inner surface thereof for receiving a pin 50 of hexagonal cross-sectional configuration. The pin 50 is not as long as the hole depth and is jammed into the hole for facilitating removal of the patterned portion of the insert following the first molding operation. Because the hole 48 is circular in cross-section and the pin 50 is hexagonal, air is compressed in the hole during injection of the first sole portion 35 and facilitates removal of the insert from the first mold cavity following the first molding operation. The exterior side surfaces of the dummy last 11 are provided with recesses 52 opposite the recesses 46 for receiving thermoplastic material, whereby the first sole portion 35 of the insert 34 (FIG. 12) produced by the first molding step includes plastic lugs or posts 54 extending upwardly from a base 55 integral with and supporting outwardly extending, maple leaf-shaped projections 56.

During the first molding operation, the top of the mold piston (not shown) is located between the mold sides 25 at a level 58 beneath the recesses 47, and the bottom surface of the dummy last 11 is located at a level 60 beneath the recesses 47, whereby the thin base 55 is molded onto the bottom surface of the filler (not shown in FIGS. 8 to 10) which fills the recess 14. During the second molding operation, the top surface of the mold piston is located at a shoulder 62 in the mold sides 45. Accordingly, the insert 34 is positioned in the top mold cavity defined by the mold piston, the mold sides 25 and the insole 17, which is placed in the recess defined by the shoulder 42 in the mold sides and clamped therein by the clamping last 13.

Figure 9:
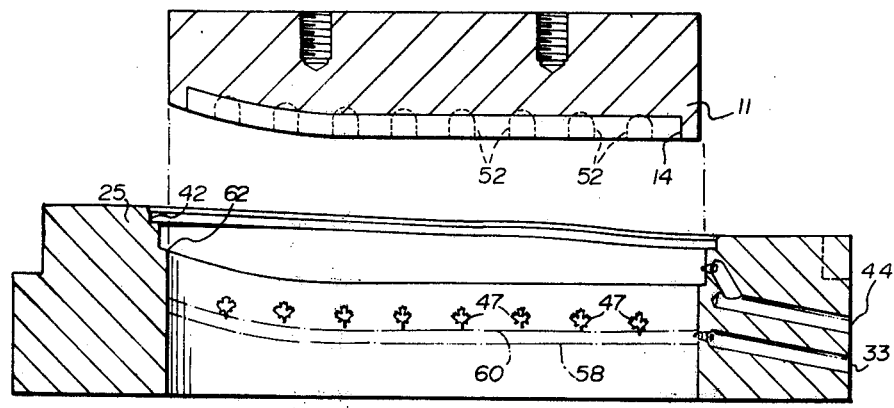
FIG. 9 is a cross-sectional view taken generally along line IX—IX of FIG. 8.
Figure 8:
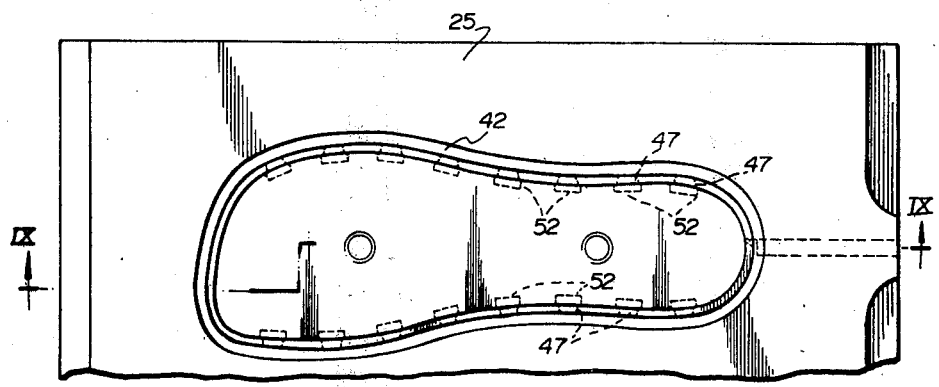
FIG. 8 is a plan view of a mold and dummy last for use in the apparatus of FIGS. 3 to 7.
Figure 10:
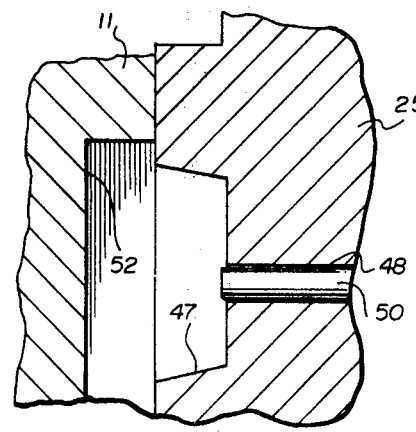
FIG. 10 is an enlarged cross-sectional view taken generally along line X—X of FIG. 8.
Figure 11:
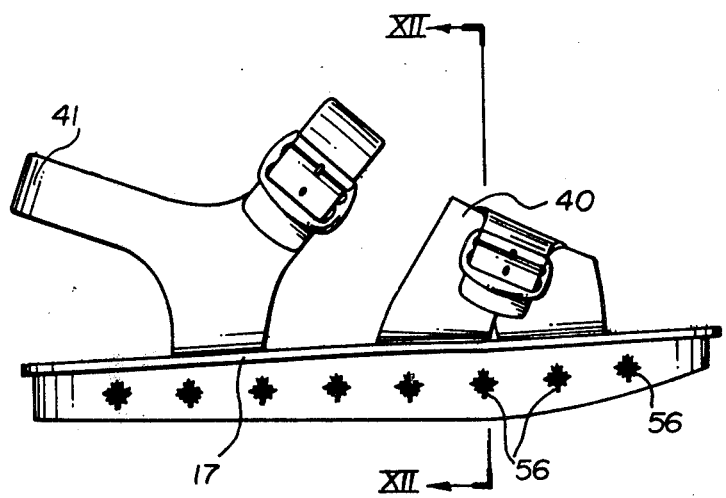
FIG. 11 is an elevation view of a sandal produced using the method and apparatus of the present invention.
Figure 12:
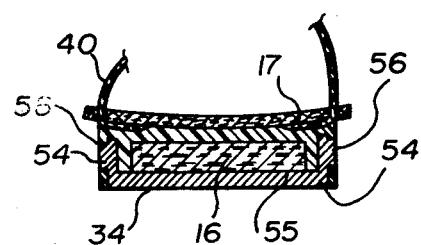
FIG. 12 is a cross-sectional view taken generally along line XII—XII of FIG. 11.

The sole produced in the apparatus of FIGS. 8 to 10 includes a plurality of projections 56, which extend outwardly through the sides of the foxing portion of the second sole portion 45. It will be appreciated that a single lug and projection can be used, and that the design of the projection can be varied depending on the desired appearance of the finished sole.

Thus, there has been described a method and apparatus for producing a sole for an article of footwear which includes an insert containing a filler, which is substantially surrounded by plastic, the sole being molded directly to the bottom of an upper or the like.

We claim:
1. A method of molding a filler-containing sole for an article of footwear comprising the steps of inserting a filler into a recess in the bottom surface of a dummy last; forming a first mold cavity employing the dummy last, the filler, first portions of opposing mold sides and a bottom mold piston; molding a first sole portion onto the bottom surface of the filler in a first molding operation; opening the mold while leaving the first sole portion and filler on the bottom mold piston; forming a second mold cavity employing an upper or the like on a clamping last, second portions of said mold sides, and the filler and said first sole portion on the bottom mold piston; and molding a second sole portion around the sides of the first sole portion and over the top and side surfaces of the filler in a second molding operation.

2. A method according to claim 1, wherein, following the first molding operation, the mold is opened by moving the dummy last upwardly out of engagement with the side molds leaving the first sole portion and the filler on the bottom mold piston; and the clamping last is moved into engagement with the side molds in spaced apart relationship to said first sole portion, filler and bottom mold piston to define said second mold cavity.

* * * * *